(12) United States Patent
van Hasselt (10) Patent No.: US 11,062,206 B2
(45) Date of Patent: Jul. 13, 2021

(54) TRAINING NEURAL NETWORKS USING NORMALIZED TARGET OUTPUTS

(71) Applicant: DeepMind Technologies Limited, London (GB)

(72) Inventor: Hado Philip van Hasselt, London (GB)

(73) Assignee: DeepMind Technologies Limited, London (GB)

( * ) Notice: Subject to any disclaimer, the term of this patent is extended or adjusted under 35 U.S.C. 154(b) by 890 days.

(21) Appl. No.: 15/349,666

(22) Filed: Nov. 11, 2016

(65) Prior Publication Data

US 2017/0140268 A1 May 18, 2017

Related U.S. Application Data

(60) Provisional application No. 62/254,618, filed on Nov. 12, 2015.

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC .................................. G06N 3/08; G06N 3/04
See application file for complete search history.

(56) References Cited

PUBLICATIONS

J. Sola, "Importance of Input Data Normalization for the Application of Neural Networks to Complex Industrial Problems", IEEE, vol. 44 issue:3 pp 1464-1468 (Year: 1997).*
J. Sola, "Importance of input Data Normalization for the Application of Neural networks to Complex Industrial Problems". IEEE, vol. 44 issues: 3 pp. 1464-1468 (Year: 1997).*
Sergey Ioffe, "Batch Normalization: Accelerating Deep Network Training by reducing internal Covariate Shift", 2015 (Year: 2015).*
Graves, "Towards End-to-End Speech Recognition with Recurrent Neural Networks", 2014 (Year: 2014).*
Wiesler, "Mean-Normalized Stochastic Gradient for Large-Scale Deep Learning", IEEE, 2014 (Year: 2014).*
International Search Report and Written Opinion issued in International Application No. PCT/US2016/061663, dated Mar. 7, 2017, 12 pages.

(Continued)

*Primary Examiner* — Ann J Lo
*Assistant Examiner* — Van C Mang
(74) *Attorney, Agent, or Firm* — Fish & Richardson P.C.

(57) ABSTRACT

Methods, systems, and apparatus, including computer programs encoded on computer storage media, for training a neural network using normalized target outputs. One of the methods includes updating current values of the normalization parameters to account for the target output for the training item; determining a normalized target output for the training item by normalizing the target output for the training item in accordance with the updated normalization parameter values; processing the training item using the neural network to generate a normalized output for the training item in accordance with current values of main parameters of the neural network; determining an error for the training item using the normalized target output and the normalized output; and using the error to adjust the current values of the main parameters of the neural network.

14 Claims, 4 Drawing Sheets

(56) References Cited

PUBLICATIONS

Tygert et al. "Scale-invariant learning and convolutional networks," arXiv preprint arXiv 1506.08230v2, Sep. 13, 2015, 12 pages.

Gulcehre et al. "Knowledge matters: importance of prior information for optimization," arXiv preprint arXiv1301.4083v6 Jul. 13, 2013, 37 pages.

Vatanen et al. "Pushing stochastic gradient towards second-order methods—backpropagation learning with transformation in nonlinearities," Lecture Notes in Computer Science vol. 8226, Nov. 3, 2013, 8 pages.

Garvin and Lempitsky. "Unsupervised domain adaptation by backpropagation," JMLR Workshop and conference Proceedings, vol. 37, Jun. 1, 2015, 12 pages.

'www.cs.toronto.edu' [online] "Neural Networks for Machine Learning: Lecture 6a Overview of mini-batch gradient descent," Hinton et al. [retrieved on Feb. 16, 2017] Retrieved from Internet URL<http://www.cs.toronto.edu/~tijmen/csc321/slides/lecture_slides_1ec6.pdf> 31 slides.

Amari. "Natural gradient works efficiently in learning," Neural computation, 10(2), Feb. 15, 1998, 36 pages.

Bellemare et al. "Increasing the action gap: New operators for reinforcement learning," arXiv preprint arXiv1512.04860, Dec. 15, 2015, 14 pages.

Bellemare et al. "The arcade learning environment: An evaluation platform for general agents," Journal of Artificial Intelligence Research, Jun. 2012, 27 pages.

Bergstra et al. "Algorithms for hyper-parameter optimization," Advances in Neural Information Processing Systems, 2011, 9 pages.

Bergstra et al. "Random search for hyper-parameter optimization," Journal of Machine Learning Resesarch Feb. 13, 2012, 25 pages.

Desjardins et al. "Natural neural networks," Advances in Neural Information Processing Systems, 2015, 9 pages.

Duchi et al. "Adaptive subgradient methods for online learning and stochastic optimization," Journal of Machines Learning Research, Jul. 12, 2011, 39 pages.

Efron. "Regression percentiles using asymmetric squared error loss," Statistic Sinica, Jan. 1, 1991, 33 pages.

Hockreiter. "The vanishing gradient problem during learning recurrent neural nets and problem solution," International Journal of Uncertainty, Fuzziness and Knowledge-Based Systems 6.02, Apr. 1998, 10 pages.

Ioffe et al. "Batch normalization: Accelerating deep network training by reducing internal covanate shift," arXiv preprint arXiv1502.03167, Feb. 11, 2015, 11 pages.

Kingma et al. "Adam: A method for stochastic optimization," arXiv preprint arXiv1412.6980v9, Jan. 30, 2017, 15 pages.

LeCun et al. "Deep learning," Nature 521.7553, May 28, 2015, 9 pages.

LeCun et al. "Gradient-based learning applied to document recognition," Proceeding of the IEEE, 86(11) Nov. 1998, 46 pages.

Liang et al. "State of the art control of Atari games using shallow reinforcement learning,"arXiv preprint arXiv 1512.01563v2 Apr. 21, 2016, 12 pages.

Martens et al "Optimizing neural networks with kronecher-factored approximate curvature," ICML, Mar. 19, 2015, 10 pages.

McCulloch et al. "A logical calculus of the ideas immanent in nervous activity," The bulletin of mathematical biophysics 5.4, Dec. 1943, 21 pages.

Mnih et al. "Asynchronous methods for deep reinforcement learning," International Conference on Machines Learning, Feb. 4, 2016, 10 pages.

Mnih et al. "Human-level control through deep reinforcement learning," Nature, 518 (7540), Feb. 26, 2015, 13 pages.

Newey et al. "Asymetric least squares estimation and testing," Econometrical Journal of the Econometric Society, Jul. 1987, 30 pages.

Osband et al. "Deep exploration via bootstrapped DQN," arXiv preprint arXiv1602.04621v3, Jul. 4, 2016, 18 pages.

Robbins et al. "A stochastic approximation method," The annals of mathematical statistics, Sep. 1, 1951, 8 pages.

Ross et al. "Normalized online learning," arXiv preprint arXiv1305.6646, May 28, 2013, 12 pages.

Rumelhart et al. "Learning internal representations by error propagation," Learning internal representations by error propagation, No. ICS-8506. California University San Diego La Jolla Inst. for Cognitive Science, Sep. 1985, 49 pages.

Schaul et al. "Prioritized experience replay," arXiv preprint arXiv 1511.05952, Nov. 18, 2015, 21 pages.

Schmidhuber. "Deep learning in neural networks: An overview," arXiv preprint arXiv1404.7828v4, Oct. 8, 2014, 88 pages.

Snoek et al. "Practical payesian optimization of machine learning algorithms," Advances in neural information processing systems, 2012, 9 pages.

Van Hasselt et al. "Deep reinforcement learning with double q-learning," arXiv preprint arXiv1509.06461v3, Dec. 8, 2015, 13 pages.

Van Hasselt, "Double Q-learning," Advances in Neural Information Processing Systems, 2010, 9 pages.

Wang et al. "Dueling Network Architectures for Deep Reinforcement Learning," arXiv preprint arXiv1511.06581v3, Apr. 4, 2016, 15 pages.

Watkins et al "Learning from Delayed rewards," PhD thesis, University of Cambridge England, 1989, 241 pages.

CN Office Action in Chinese Appln. No. 201680066502.1, dated Jun. 9, 2020, 9 pages (with machine translation).

CN Office Action in Chinese Appln. No. 201680066502.1, dated Dec. 27, 2019, 9 pages (with English translation).

* cited by examiner

TRAINING NEURAL NETWORKS USING NORMALIZED TARGET OUTPUTS

CROSS-REFERENCE TO RELATED APPLICATION

This application claims priority to U.S. Provisional Application No. 62/254,618, filed on Nov. 12, 2015. The disclosure of the prior application is considered part of and is incorporated by reference in the disclosure of this application.

BACKGROUND

This specification relates to training neural networks.

Neural networks are machine learning models that employ one or more layers of models to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in methods for training a neural network using normalized target outputs.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. By adaptively rescaling the target outputs during training, the neural network can be effectively trained even if magnitudes of target outputs change during the training. In particular, adaptively rescaling target outputs in the manner described in this specification can be beneficial when a single algorithm is being applied to solve multiple problems, i.e., to train the neural network to perform multiple different tasks. As another example, adaptively rescaling outputs during training allows the natural magnitude of each output to be disentangled from the importance assigned to it in the loss function. This is particularly useful when the outputs are in different units, e.g., when the neural network is simultaneously predicting many signals of an agent with multi-modal sensors. As yet another example, adaptive scaling can help in problems that are non-stationary, such as in reinforcement learning where the policy of behavior is often learned along with a value function and therefore the distribution and magnitudes of the targets can change unexpectedly and repeatedly as training progresses.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
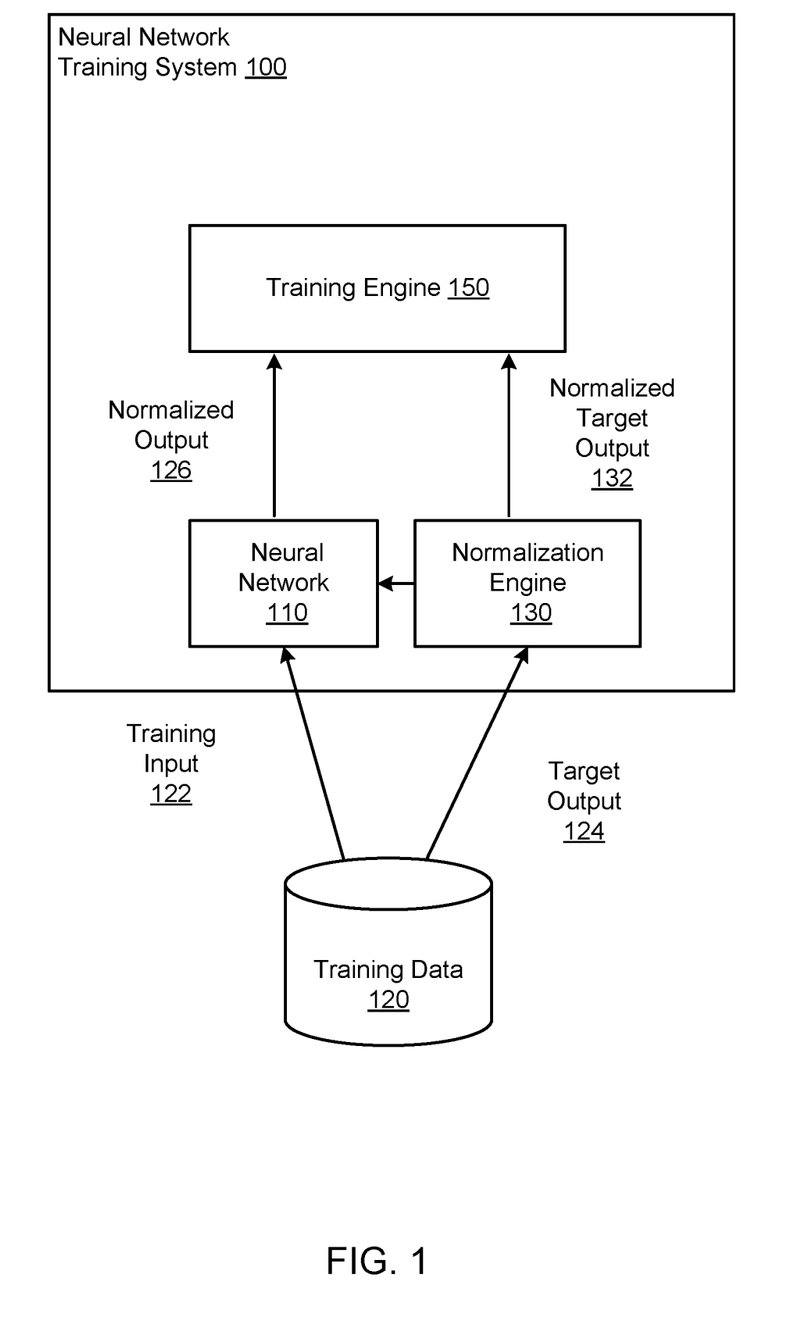
FIG. 1 shows an example neural network training system.

FIG. 1 shows an example neural network training system 100. The neural network training system 100 is an example of a system implemented as computer programs on one or more computers in one or more locations, in which the systems, components, and techniques described below can be implemented.

The neural network training system 100 trains a neural network 110 on training items from a training data repository 120 to determine trained values of the parameters of the neural network 110 from initial values of the parameters.

The neural network 110 can be a feedforward deep neural network, e.g., a convolutional neural network, or a recurrent neural network, e.g., a long short term (LSTM) neural network.

The neural network 110 can be configured to receive any kind of digital data input and to generate any kind of score or classification output based on the input.

For example, if the inputs to the neural network 110 are images or features that have been extracted from images, the output generated by the neural network 110 for a given image may be scores for each of a set of object categories, with each score representing an estimated likelihood that the image contains an image of an object belonging to the category.

As another example, if the inputs to the neural network 110 are Internet resources (e.g., web pages), documents, or portions of documents or features extracted from Internet resources, documents, or portions of documents, the output generated by the neural network 110 for a given Internet resource, document, or portion of a document may be a score for each of a set of topics, with each score representing an estimated likelihood that the Internet resource, document, or document portion is about the topic.

As another example, if the inputs to the neural network 110 are features of an impression context for a particular advertisement, the output generated by the neural network 110 may be a score that represents an estimated likelihood that the particular advertisement will be clicked on.

As another example, if the inputs to the neural network 110 are features of a personalized recommendation for a user, e.g., features characterizing the context for the recommendation, e.g., features characterizing previous actions taken by the user, the output generated by the neural network 110 may be a score for each of a set of content items, with each score representing an estimated likelihood that the user will respond favorably to being recommended the content item.

As another example, if the input to the neural network 110 is a sequence of text in one language, the output generated by the neural network 110 may be a score for each of a set of pieces of text in another language, with each score representing an estimated likelihood that the piece of text in the other language is a proper translation of the input text into the other language.

As another example, if the input to the neural network 110 is a sequence representing a spoken utterance, the output generated by the neural network 110 may be a score for each of a set of pieces of text, each score representing an estimated likelihood that the piece of text is the correct transcript for the utterance.

Generally, the neural network training system 100 trains the neural network 110 to generate normalized outputs that are mappable, i.e., that can be mapped to, un-normalized outputs in accordance with a set of normalization parameters. That is, if, after training, un-normalized outputs are desirable, the outputs generated by the neural network 110 can be un-normalized by applying the normalization parameters to the outputs generated by the neural network 110.

In particular, the neural network 110 includes one or more initial neural network layers that generate an initial output in accordance with a set of main parameters and a normalization layer that normalizes the initial outputs to generate normalized outputs in accordance with a set of auxiliary parameters. The architecture of the initial neural network layers is dependent on the kinds of inputs that the neural network 110 is configured to process and the kinds of outputs that the neural network 110 is configured to generate.

In some implementations, the normalization layer is a linear layer that has an auxiliary parameter matrix and an auxiliary bias matrix. In these implementations, the normalized output can satisfy:

$$h_{norm} = Wh + b,$$

where W is the auxiliary parameter matrix, h is the initial output, and b is the auxiliary bias matrix.

The normalized output can then be mapped to an un-normalized output in accordance with a set of normalization parameters.

In some implementations, the normalization parameters include a scale parameter matrix and a shift parameter vector. In these implementations, the normalized output can satisfy:

$$\tilde{X} = \Sigma h_{norm} + \mu,$$

where $\Sigma$ is the scale parameter matrix and $\mu$ is the shift parameter vector.

The training data in the training data repository 120 includes a sequence of training items. Generally, each training item is an input of the kind that the neural network 110 is configured to receive. The training data repository 120 also includes, for each training item, a respective target output, i.e., the output that should be generated by the neural network 110 by processing the training item.

In order to train the neural network 110 on a given training item from the training data repository 120, e.g., a training item 122, a normalization engine 130 in the neural network training system 100 modifies the current values of the normalization parameters based on the target output for the training item, e.g., based on a target output 124 for the training item 122. The neural network training system 100 then normalizes the target output for the training item using the modified values of the normalization parameters to generate a normalized target output, e.g., the normalized target output 132 for the target output 124. Thus, during the training, the normalization engine 130 repeatedly updates the values of the normalization parameters. The manner in which the normalization engine 130 modifies the normalization parameter values is described in more detail below with reference to FIG. 3.

The normalization engine 130 also updates the values of the auxiliary parameters based on the modified normalization parameter values and then generates a normalized output for the training input, e.g., a normalized output 126 for the training input 122, by processing the training input using the neural network 110 in accordance with current values of the main parameters and the updated values of the auxiliary parameters.

A training engine 150 in the neural network training system 100 trains the neural network 110 using the normalized target output for the training item, i.e., instead of the training input for the training item, and the normalized output for the training item by performing an iteration of a neural network training technique to optimize an objective function and to update the current values of the main parameters and further update the updated values of the auxiliary parameters. Training the neural network using this data is described in more detail below with reference to FIGS. 2-4.

By training the neural network 110 using normalized target outputs, the neural network training system 100 can determine trained values for the parameters of the neural network 110 that ensure that the neural network 110 generates accurate normalized outputs, i.e., normalized outputs that tend to match normalized actual outputs, for received inputs, or, once an output generated by the neural network 110 has been un-normalized, to generate accurate un-normalized outputs.

In some implementations, once the neural network 110 has been trained to determine the trained values of the parameters, the neural network training system 100 stores the trained values of the parameters of the neural network 110 for use in instantiating a trained neural network or provides the trained values of the parameters to another system for use in instantiating a trained neural network.

Figure 2:
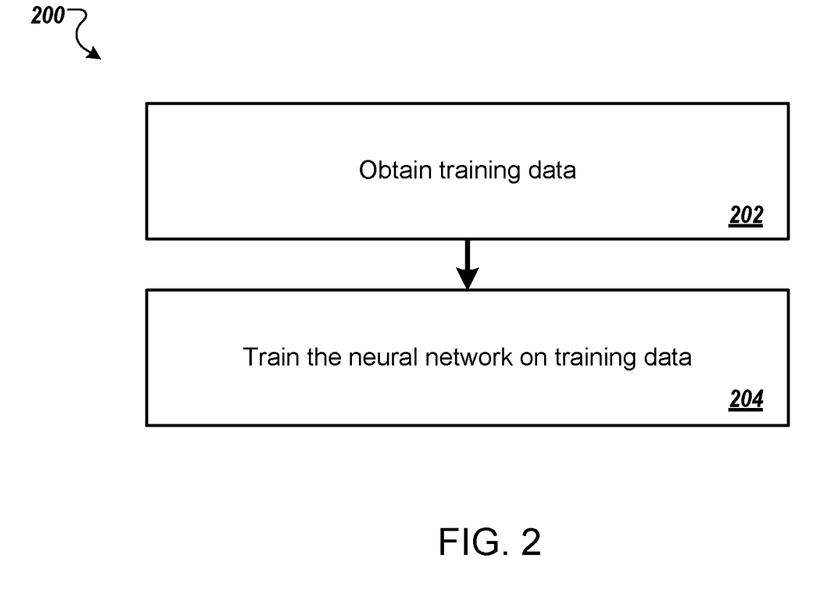
FIG. 2 is a flow diagram of an example process for training a neural network using normalized target outputs.

FIG. 2 is a flow diagram of an example process 200 for training a neural network using normalized target outputs. For convenience, the process 200 will be described as being performed by a system of one or more computers located in one or more locations. For example, a neural network training system, e.g., the neural network training system 100 of FIG. 1, appropriately programmed, can perform the process 200.

The system obtains training data for the neural network, e.g., from the training data repository 120 of FIG. 1 (step 202). The training data includes a sequence of training items and, for each of the multiple training items, a respective target neural network output.

The system trains the neural network on each of the multiple training items and, for each of the training items, a normalized target output for the training item to optimize an objective function (step 204).

In particular, the system processes each of the training items in sequence and, before training the neural network on each training item, adjusts the current values of the normalization parameters and uses the adjusted values of the normalization parameters to determine a target output for the training item. The system then adjusts the auxiliary parameters based on the adjustment to the normalization parameters and generates a normalized output for the training item in accordance with the adjusted values of the auxiliary parameters and current values of the main parameters.

The system trains the neural network by optimizing a specified objective function, i.e., as specified by a system designer or other user of the system, using a neural network training procedure. The objective function can be any appropriate machine learning objective function, e.g., a cross-entropy loss function or a mean-squared loss function, but, for a given training item, generally takes as input a normalized output generated by the neural network for the training item and the normalized target output for the training item.

The neural network training technique may be, for example, a conventional stochastic gradient descent with backpropagation training procedure. By repeatedly performing multiple iterations of the training technique, the system determines trained values of the auxiliary and main parameters of the neural network.

Figure 3:
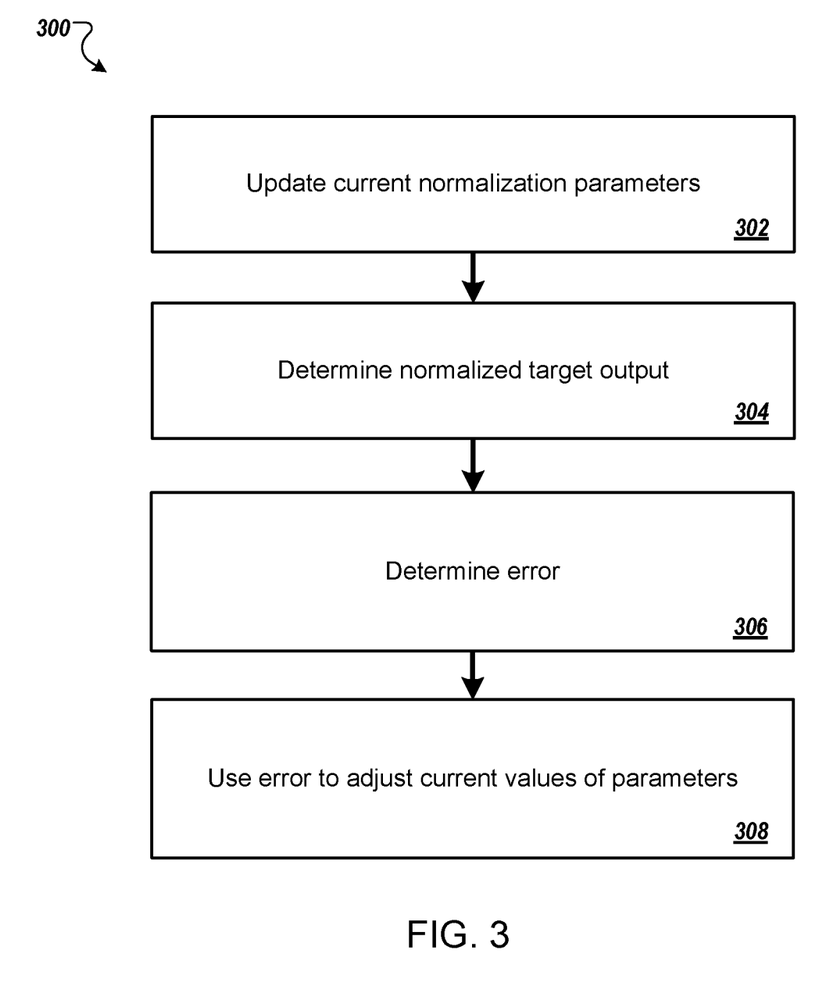
FIG. 3 is a flow diagram of an example process for training a neural network on a training item and a normalized target output for the training item.

FIG. 3 is a flow diagram of an example process 300 for training a neural network on a training item and a normalized target output for the training item. For convenience, the process 300 will be described as being performed by a system of one or more computers located in one or more locations. For example, a neural network training system, e.g., the neural network training system 100 of FIG. 1, appropriately programmed, can perform the process 300.

The system updates the current values of the normalization parameters, i.e., the values after processing the preceding training input, to account for the target output for the current training input (step 302). In particular, the system updates the current normalization parameter values so that the normalized target outputs for the training items up to and including the training item in the sequence have a specified distribution.

For example, the specified distribution can specify that the normalized target outputs have approximately zero mean and unit variance. Thus, the system sets the normalization parameter values, i.e., the values of the scale parameter matrix and the shift parameter vector, to values such that, for each element of the target outputs, after the value of that element of all of the target outputs is normalized using the updated normalization parameter values, the values have approximately zero mean and unit variance.

The system determines a normalized target output for the training item by normalizing the target output for the training item in accordance with the updated normalization parameter values (step 304). In particular, the system applies the updated values of the normalized parameters, e.g., of the scale parameter matrix and the shift parameter vector, to the target output to generate the normalized target output. For example, the normalized target output can satisfy:

$$\tilde{Y} = \Sigma_{new}^{-1}(Y - \mu_{new}),$$

where $\Sigma_{new}^{-1}$ is the new scale parameter matrix and $\mu_{new}$ is the new shift parameter vector.

The system generates a normalized output for the training item in accordance with current values of the main parameters of the neural network (step 306). More specifically, the system updates the values of the auxiliary parameters based on the update to the normalization parameters and generates the normalized output in accordance with the updated values of the auxiliary parameters and the current values of the main parameters. Generating the normalized output is described in more detail below with reference to FIG. 4.

The system determines an error for the training item using the normalized target output and the normalized output (step 308). The manner in which the system calculates the error is dependent on the objective function being optimized. For example, for a mean-squared loss function, the system determines the difference between the normalized output and the target output.

The system uses the error to adjust the current values of the main parameters and the updated values of the auxiliary parameters by performing an iteration of a neural network training procedure (step 310). The neural network training procedure is a conventional neural network training procedure, e.g., stochastic gradient descent. Thus, during one iteration of the neural network training procedure, the auxiliary parameter values are updated twice: once based on the update to the normalization parameters and then again using the error.

Figure 4:
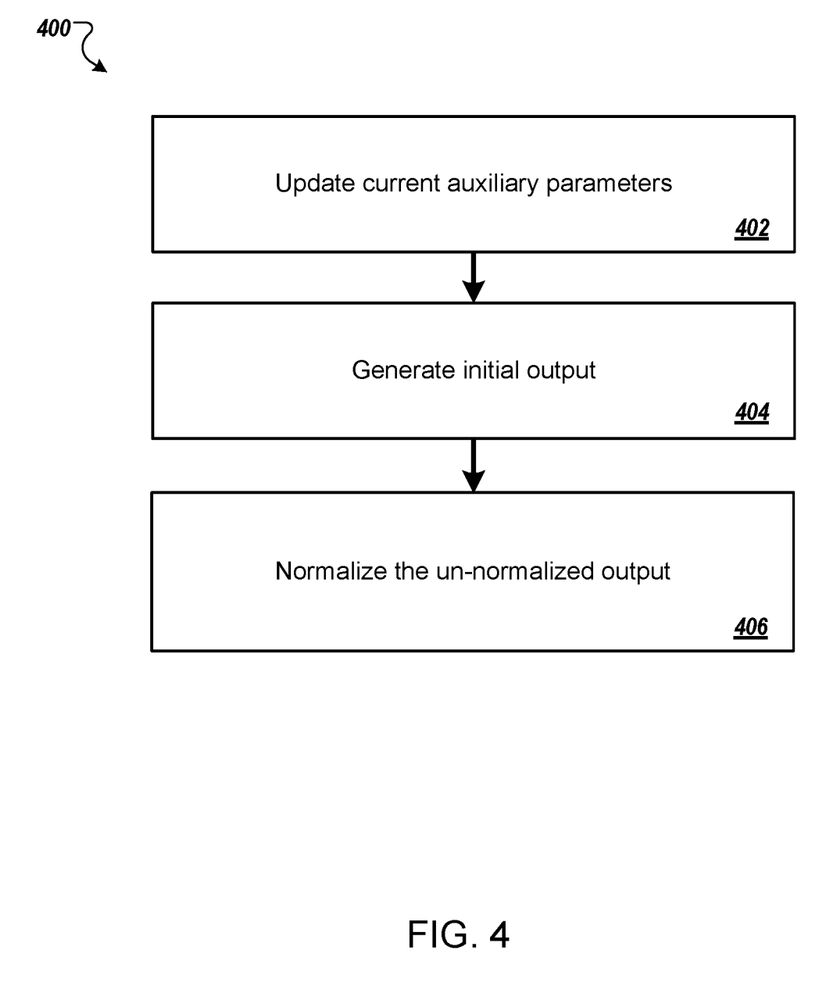
FIG. 4 is a flow diagram of an example process for generating a normalized output for a training item while training a neural network using normalized target outputs.

FIG. 4 is a flow diagram of an example process 400 for generating a normalized output for a training item while training a neural network using normalized target outputs. For convenience, the process 400 will be described as being performed by a system of one or more computers located in one or more locations. For example, a neural network training system, e.g., the neural network training system 100 of FIG. 1, appropriately programmed, can perform the process 400.

The system updates the current values of the auxiliary parameters to preserve the mapping between the un-normalized outputs and the normalized outputs despite the updating of the current values of the normalization parameters (step 402). That is, the system updates the auxiliary parameters to cancel out the effect of updating the current values of the normalization parameters on the mapping.

For example, the new auxiliary weight matrix can satisfy:

$$W = \Sigma_{new}^{-1} \Sigma W_{old},$$

where $\mathrm{E}_{new}^{-1}$ is the inverse of the new scale matrix, E is the old scale matrix, and $W_{old}$ is the old auxiliary weight matrix, and the new auxiliary bias vector can satisfy:

$$b = \Sigma_{new}^{-1}(\Sigma b_{old} + \mu - \mu_{new}),$$

where $b_{old}$ is the old auxiliary bias vector, $\mu$ is the old shift vector, and $\mu_{new}$ is the new shift vector.

The system processes the training item using the neural network in accordance with current values of the main parameters of the neural network to generate an initial output for the training item (step 404).

The system normalizes the initial output in accordance with the updated values of the auxiliary parameters to generate the normalized output (step 406). That is, the system applies the updated values of the auxiliary parameters to the initial output to generate the normalized output. For example, the normalized output can satisfy:

$$h_{norm} = Wh + b,$$

where h is the initial output.

By repeatedly performing the processes 300 and 400 for multiple training items, the system can train the neural network 300 and 400 to determine trained values of the auxiliary and main parameters while continuing to update the normalization parameter values to account for the possibility of the magnitudes of the target outputs changing during the training, improving the efficiency and effectiveness of the training process.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for training a neural network on training data to generate normalized outputs that are mappable to un-normalized outputs in accordance with a set of normalization parameters, wherein the training data comprises a sequence of training items and, for each training item in the sequence, a respective target output associated with the training item, wherein the target output is an output expected to be generated by the neural network for the training item, and wherein the method comprises, for each training item in the sequence:

obtaining a target output for the training item from the training data;

updating current values of the normalization parameters to account for magnitudes of target outputs for training inputs changing during training by updating the current values so that the normalized target outputs for the training items up to and including the training item in the sequence of training data have a specified distribution;

updating current values of auxiliary parameters to preserve a mapping between the un-normalized outputs and the normalized outputs despite the updating of the current values of the normalization parameters;

determining a normalized target output by normalizing the target output obtained from the training data in accordance with the updated normalization parameter values;

processing the training item using the neural network to generate a normalized output of the neural network for the training item in accordance with current values of main parameters of the neural network, comprising:

processing the training item using the neural network in accordance with the current values of the main parameters of the neural network to generate an initial output of the neural network for the training item, and normalizing the initial output in accordance with the updated values of the auxiliary parameters to generate the normalized output;

determining an error for the training item using an objective function that takes as input (i) the normalized output generated for the training item by the neural network and (ii) the normalized target output generated by normalizing the target output associated with the training item in the training data; and using the error to adjust the current values of the main parameters of the neural network.

2. The method of claim 1, wherein the normalization parameters comprise a shift parameter and a scale parameter of the normalization.

3. The method of claim 2, wherein determining the normalized target output comprises applying the updated values of the scale parameter and the shift parameter to the target output.

4. The method of claim 1, wherein the normalized outputs generated by the neural network are mappable to un-normalized outputs in accordance with the normalization parameters and the auxiliary parameters.

5. The method of claim 1, wherein updating the current values of the auxiliary parameters to preserve the mapping between the un-normalized outputs and normalized outputs despite the updating of the current values of the normalization parameters comprises updating the current values of the auxiliary parameters to cancel out the effect of updating the current values of the normalization parameters on the mapping.

6. The method of claim 1, wherein using the error to adjust the current values of the parameters of the neural network comprises: performing an iteration of a neural network training technique to adjust the current values of the main parameters of the neural network.

7. The method of claim 6, further comprising:

adjusting the updated values of the auxiliary parameters as part of performing the iteration of the neural network training technique.

8. The method of claim 6, wherein the neural network training technique is stochastic gradient descent (SGD).

9. A system comprising one or more computers and one or more storage devices storing instructions that, when executed by the one or more computers, cause the one or more computers to perform operations for training a neural network on training data to generate normalized outputs that are mappable to un-normalized outputs in accordance with a set of normalization parameters, wherein the training data comprises a sequence of training items and, for each training item in the sequence, a respective target output associated with the training item, wherein the target output is an output expected to be generated by the neural network for the training item, and wherein the operations comprise, for each training item in the sequence:

obtaining a target output for the training item from the training data;

updating current values of the normalization parameters to account for magnitudes of target outputs for training inputs changing during training by updating the current values so that the normalized target outputs for the training items up to and including the training item in the sequence of training data have a specified distribution;

updating current values of auxiliary parameters to preserve a mapping between the un-normalized outputs and the normalized outputs despite the updating of the current values of the normalization parameters;

determining a normalized target output by normalizing the target output obtained from the training data in accordance with the updated normalization parameter values;

processing the training item using the neural network to generate a normalized output for the training item in accordance with current values of main parameters of the neural network, comprising:
  processing the training item using the neural network in accordance with the current values of the main parameters of the neural network to generate an initial output for the training item, and
  normalizing the initial output in accordance with the updated values of the auxiliary parameters to generate the normalized output;

determining an error for the training item using an objective function that takes as input (i) the normalized output generated for the training item by the neural network and (ii) the normalized target output generated by normalizing the target output associated with the training item in the training data; and using the error to adjust the current values of the main parameters of the neural network.

10. The system of claim 9, wherein the normalization parameters comprise a shift parameter and a scale parameter of the normalization.

11. The system of claim 10, wherein determining the normalized target output comprises applying the updated values of the scale parameter and the shift parameter to the target output.

12. The system of claim 9, wherein the normalized outputs generated by the neural network are mappable to un-normalized outputs in accordance with the normalization parameters and the auxiliary parameters.

13. The system of claim 9, wherein updating the current values of the auxiliary parameters to preserve the mapping between the un-normalized outputs and normalized outputs despite the updating of the current values of the normalization parameters comprises updating the current values of the auxiliary parameters to cancel out the effect of updating the current values of the normalization parameters on the mapping.

14. One or more non-transitory computer-readable media storing instructions that, when executed by one or more computers, cause the one or more computers to perform operations for training a neural network on training data to generate normalized outputs that are mappable to un-normalized outputs in accordance with a set of normalization parameters, wherein the training data comprises a sequence of training items and, for each training item in the sequence, a respective target output associated with the training item, wherein the target output is an output expected to be generated by the neural network for the training item, and wherein the operations comprise, for each training item in the sequence:

obtaining a target output for the training item from the training data;

updating current values of the normalization parameters to account for magnitudes of target outputs for training inputs changing during training by updating the current values so that the normalized target outputs for the training items up to and including the training item in the sequence of training data have a specified distribution;

updating current values of auxiliary parameters to preserve a mapping between the un-normalized outputs and the normalized outputs despite the updating of the current values of the normalization parameters, determining a normalized target output by normalizing the target output obtained from the training data in accordance with the updated normalization parameter values;

processing the training item using the neural network to generate a normalized output of the neural network for the training item in accordance with current values of main parameters of the neural network, comprising:
  processing the training item using the neural network in accordance with the current values of the main parameters of the neural network to generate an initial output of the neural network for the training item, and
  normalizing the initial output in accordance with the updated values of the auxiliary parameters to generate the normalized output;

determining an error for the training item using an objective function that takes as input (i) the normalized output generated for the training item by the neural network and (ii) the normalized target output generated by normalizing the target output associated with the training item in the training data; and using the error to adjust the current values of the main parameters of the neural network.

* * * * *